United States Patent Office 3,751,544
Patented Aug. 7, 1973

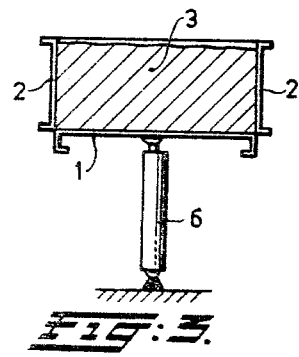
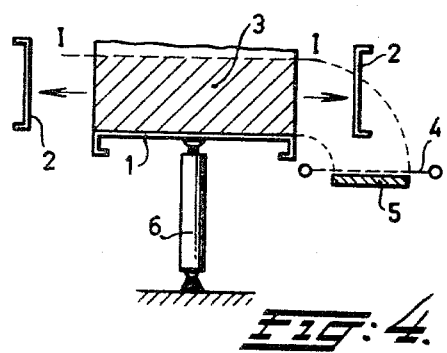
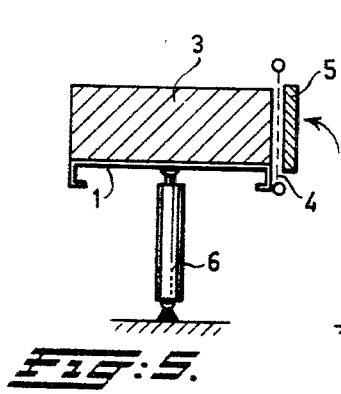
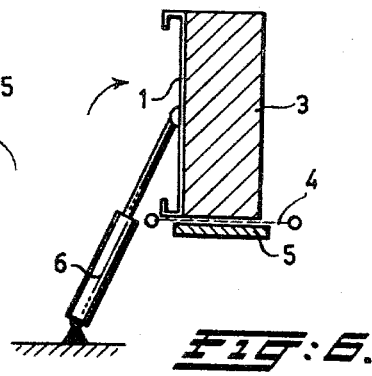
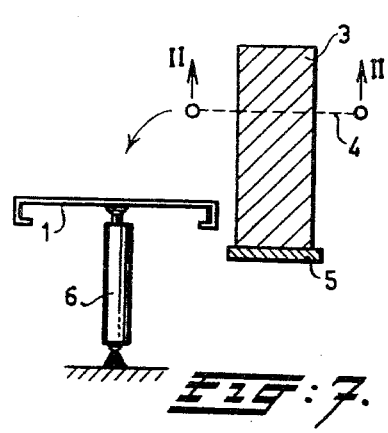
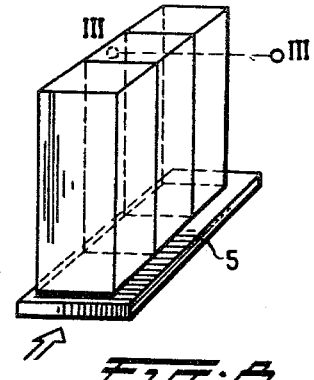

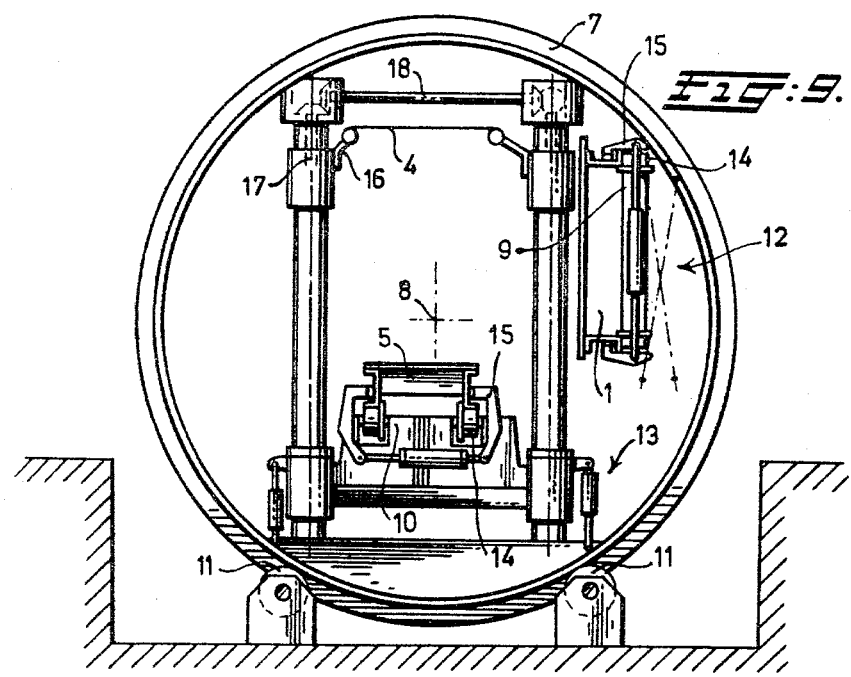
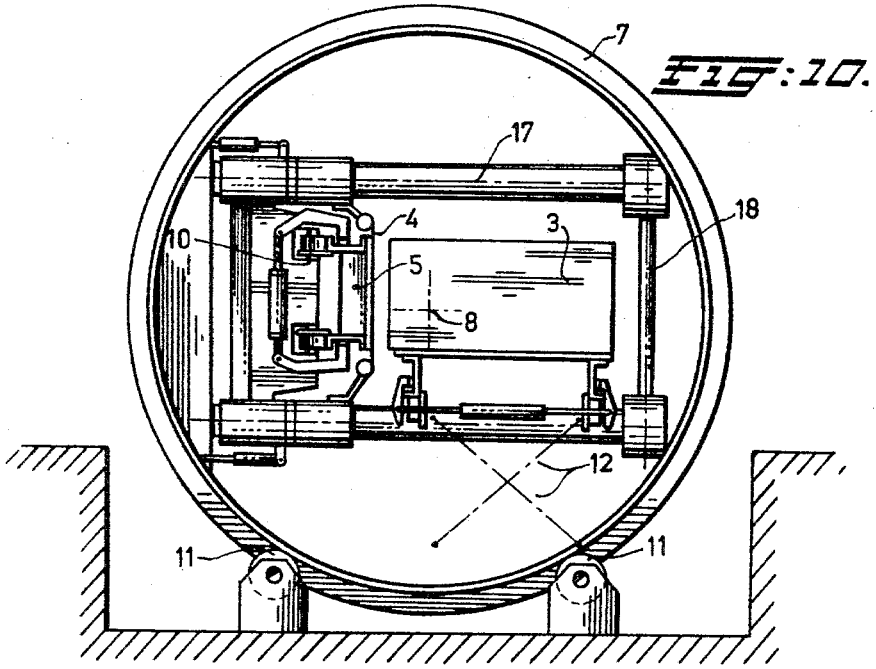

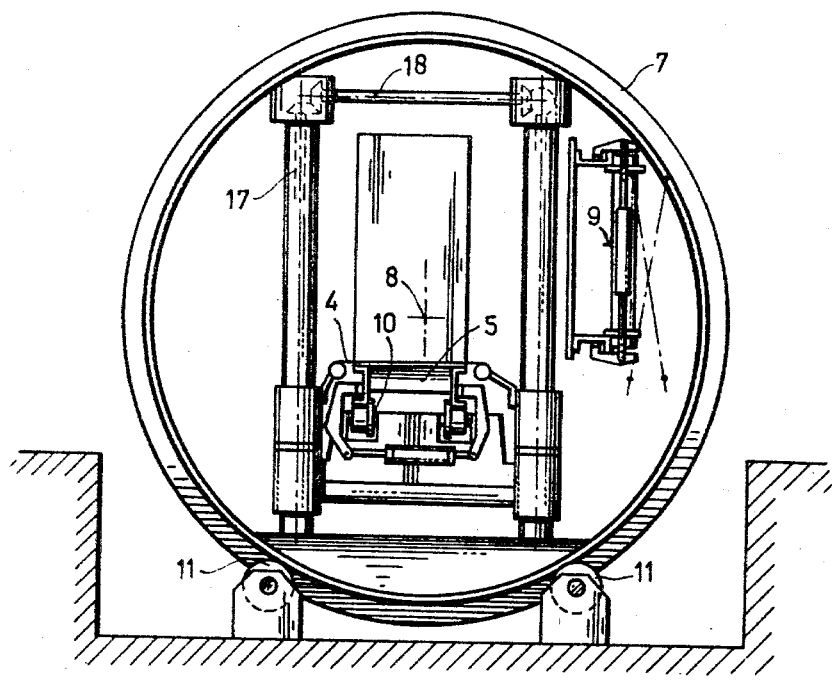
Fig: 11.

3,751,544
METHOD FOR CUTTING THROUGH A BLOCK OF PLASTIC MATERIAL
Johannes Jacobus Smorenburg, Abcoude, Netherlands, assignor to Stork Amsterdam N.V., Amstelveen, Netherlands
Filed July 8, 1971, Ser. No. 160,724
Claims priority, application Netherlands, July 17, 1970, 7010674
Int. Cl. B28b *11/14*
U.S. Cl. 264—157      2 Claims

ABSTRACT OF THE DISCLOSURE

The cutting through a block of light concrete along planes parallel to the upstanding sides of the block, is performed subsequent to a tilting movement around a line parallel to an edge of the bottom of the block by means of an auxiliary supporting surface with at least one cutting wire lying upon said surface.

DISCUSSION OF THE PRIOR ART

The invention relates to a method for cutting by means of at least one wire through a block of light concrete or other plastic material, which block is manufactured by casting the material into a mold composed of a bottom and detachable, perpendicular, side walls, the cutting being effected according to a plane which is parallel or almost parallel to a side wall.

The cutting of such a block according to a plane parallel to the bottom of the mold is mostly not attended with difficulties. Problems occur, however, when also a cutting parallel or almost parallel to one of the upright side walls of the mold is desired. It has been attempted to provide a solution for this problem by transferring the block of which one or more vertical wires can move.

This method has some drawbacks because the block which is still in a plastic condition should be seized in order to place same on the grid bars, whereby a rather long setting time must be observed. These bars cause further a limitation in the location of the planes of severance, since such a severance can only be effected by means of vertical cutting wires moving between the grid bars.

SUMMARY OF THE INVENTION

It is an object of the invention to provide a method which avoids these difficulties and which has further advantages.

This object is attained according to the invention by:
removing at least two opposite side walls from the mould;
disposing subsequently a flat auxiliary member against an uncovered side of the block, whilst simultaneously applying at least one vertical cutting wire between the block and this member;
turning over the block about a line coinciding with or being almost parallel to the intersecting line of the auxiliary member and the bottom until the block entirely bears on this member, and
removing the original bottom from the mould and moving finally upwards said wire(s) in an almost horizontal position.

For the required turning over operation it is not necessary to wait until the material has set to an extent as is required for seizing the block. The cutting aimed at can therefore be effected at an earlier time, whereby a smaller investment suffices.

The essential advantage obtained is connected with the circumstance that mostly the original side of the block has a height smaller than the original width of the block. As a consequence the wires for the cutting transverse to the longitudinal direction may be shorter than is mostly required according to the conventional method.

After the cutting aimed at has been effected by moving upwards in a horizontal position the wire(s) situated on the auxiliary member functioning as a temporary supporting surface, the cutting parallel to the other pair original side walls of the mould can be effected in a simple way by means of one or more horizontally tensioned cutting wires which are moved in a horizontal direction through the block. This cutting was so far realized by means of vertical wires moving from between the horizontal grid bars.

The method according to the invention has moreover the following advantages.

On cutting small elements by means of the horizontal wire, after the block of plastic mass has been transferred to the auxiliary member or conveyor member, grooves can be cut in a simple way into the plastic material on the sides in each element. These grooves are normally required in the longitudinal sides of concrete elements in order to secure them to each other. In other systems in which this block is not turned over, this provision, on the under side and upper side, is more difficult so that this is often substituted by milling after the setting of concrete elements. The latter process involves the purchase of a milling machine and much wear of the milling cutters.

After turning over, the original under side smeared by moulding oil can be easily trimmed so that one side is not of inferior quality, as is usually the case with non-turned over supported cutting systems.

It is a further object of the invention to perform a second cutting immediately subsequent to the completion of the upward movement of the cutting wires, by activating the conveyor member and passing the block through one or more horizontal cutting wires.

The invention also aims to provide a device for manufacturing building elements of light concrete or other plastic material, comprising a conveyor for feeding through moulds. According to the invention a second conveyor member adjoining the conveyor for feeding through the mould, is provided, the former being capable of being turned over about a line parallel to or almost parallel to the boundary line between the two conveyors, while furthermore a mechanism is provided for rolling over and back again the second conveyor element, while at least one of the rolling movements of the member is effected together with the bottom of the mold.

SURVEY OF THE DRAWINGS

FIGS. 3–8 represent the most important part of the device for performing the method.

FIGS. 9–11 show some stages of the operation of another device for performing the method.

DESCRIPTION OF PREFERRED EMBODIMENTS

Figure 1:
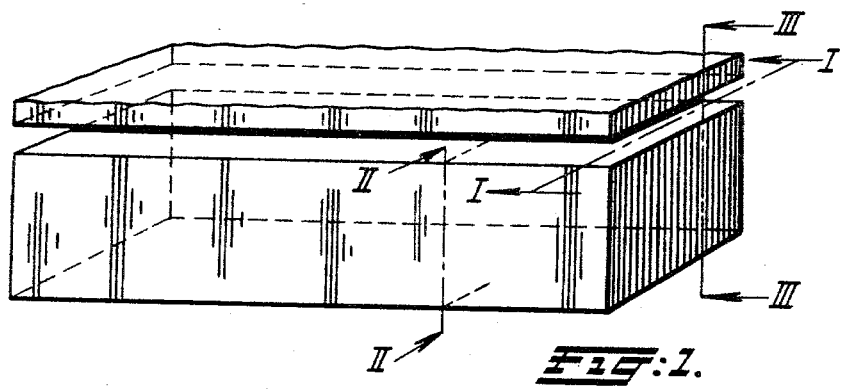
FIG. 1 shows diagrammatically a block of plastic material wherein the three directions in which cutting is effected are represented.

The block represented in FIG. 1 is lying in the position in which it is manufactured by casting into a mould open at its upper end. This mould is constructed in the usual way from a bottom with four detachable side walls. In order to impart a pure parallelepipedon shape to the block, mostly the free upper side is severed. FIG. 1 shows this severance by means of a diagrammatically represented wire moving with respect to the block according to the arrows I—I. This severance can be effected in a conventional way by removing the side walls of the mould and by moving the cutting wire and the block in a horizontal direction with respect to each other.

Figure 2A:
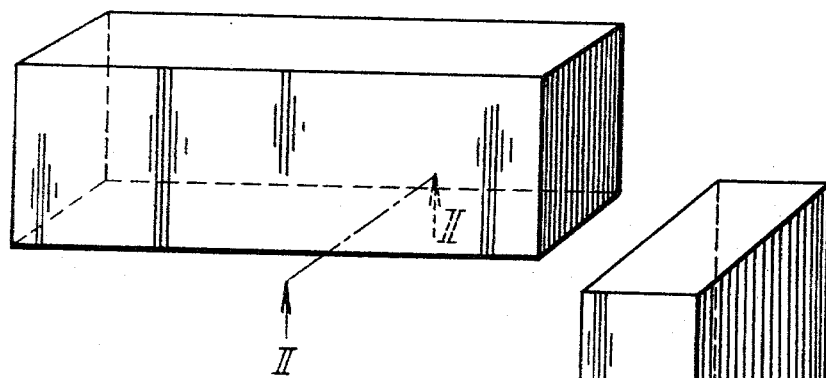
FIGS. 2A and 2B show diagrammatically an intermediate stage of the method.

The invention relates to the severance according to a plane indicated by the arrows II—II and/or III—III in FIG. 1. In case of a severance according to a plane II—II (see FIG. 2A) a flat auxiliary member embodied as a conveyor 5 is disposed against the side of the block after at first one or more cutting wires 4 are placed between the block 3 and this conveyor member 5. Thereupon the block is rolled over about a line parallel to the secant between the original under side of the block and the side against which bears the aforementioned conveyor member so that the latter side starts to function as under side. The bottom 1 of the mould which has also performed this turning over movement is now removed whereupon the situation depicted in FIG. 2A arises. Thereupon the wires are moved upwards and the severance according to the plane II—II is obtained.

The process just described is depicted in the FIGS. 3–7. The mould consisting of a bottom 1 and side walls 2 contains a quantity of plastic material 3 in the shape of a block (FIG. 3). After the side walls 2 are removed (FIG. 4) the cutting I—I is effected in order to get rid of the irregular upper side of the block. Thereupon some wires 4 are laid on the conveyor member 5, whereupon this entirety is placed against a side of the block 3, so that the situation according to FIG. 5 arises. Thereupon the whole is turned over by means of the hydraulic jack 6 or another turn over device under the bottom 1 of the mould (FIG. 6). The block 3 now bears on the conveyor member 5 and on the wires 4. Thereupon the bottom 1 is returned to its original position (FIG. 7) and the side walls 2 could be applied again. Finally the tensioned wires 4 are moved upwards to perform the cutting II—II.

It should be noted that the bottom 1 can form a part of a conveyor for feeding through mould 2 for the blocks to be manufactured. The second conveyor member 5 is provided with means (not shown) for turning upwards this auxiliary member.

Figure 2B:
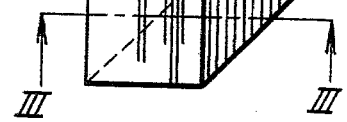

The same method can be performed in order to achieve the cutting according to a plane indicated by the arrows III—III in FIG. 1. For that purpose the auxiliary member 5 with cutting wires 4 is disposed against the concerning side (properly speaking the front side) of the block 3 and thereupon the block is turned over after which the situation as depicted in FIG. 2B arises. Both in the situation according to FIG. 2A and according to FIG. 2B it is possible to perform a third cutting according to the plane III—III or II—II subsequent to the severance according to the plane II—II or III—III, respectively. This is effected by means of one or more horizontally tensioned wires which with respect to the block 3 are caused to perform a relative horizontal movement (FIG. 8).

The modified embodiment according to the FIGS. 9–11 consists of a supporting frame 7 capable of turning about a horizontal center line 8. A guide 9 is provided within this frame 7 for the feeding through conveyor 1 and a guide 10 for the second conveyor member 5. These guides are parallel to the center lines 8 but are at right angles with one another.

The frame 7 is supported by two driven rollers 11 constituting means for turning over the frame through an angle of 90° about the center line 8. Within the frame 7 a mechanism 12 is provided, embodied as a hydraulically operated single link "lazy tong" for reciprocating the guide 9 for the conveyor 1 transversely to the direction of transport. The guide 10 can likewise be reciprocated by a hydraulically operated mechanism 13 in a direction transverse to the direction of conveyance.

The guides 9 and 10 are both provided with wheels 14 about which the conveyor members 1 and 5 can roll. Both guides are further provided with hydraulically operated clamping levers 15 for retaining the members 1 and 5 in a particular position on the wheels 14. The upward and downward movement of the cutting wires 4 is effected by means of a frame 16 and screw spindles 17 which are mutually coupled by a connection 18.

The operation of the device according to FIGS. 9–11 is as follows:

The situation depicted in FIG. 9 shows the moment at which the cutting by the wires 4 is completed and the block 3 on the preceding conveyor members 5 has been moved from the frame 7, and a new empty member 5 has been introduced. The frame 16 with the cutting wires 4 is moved inwards by operating the spindles 17, while the new member 5 is locked by the levers 15.

Hereupon the member 5 and the frame 16 are moved downwardly over a short distance whereby the distance to the center line 8 increases. Simultaneously the guide 9 is displaced in the direction of the center line 8, so that the wheels 14 are at the proper level for receiving a next member 1.

Thereupon the frame turns through 90° after which the conveyor member 1 is unlocked and a new block 3 is introduced bearing on the bottom 1 of the feeding through conveyor, while the preceding conveyor member 1 is pushed outwards. The member 1 is thereupon locked by the levers 15 (situation according to FIG. 10).

The member 5 with the cutting wires 4 is now pressed against the side of the block 3. The frame turns thereupon back through 90°, so that the block 3 bears on the second conveyor member 5.

The guide 9 together with the member 1 (the bottom of the mould) is displaced by the mechanism 12, so that the distance to the center line 8 is increased and the member 1 entirely clears the spindle (FIG. 11).

The frame 16 is moved upwards and after the cutting has been complete the member 5 carries the block 3 from the frame 7 after the locking by the levers 15 has been released.

A new member 5 is introduced into the frame 7, the frame 16 can descend again and the described cycle is completed.

It will be understood that this invention is susceptible to modification in order to adapt it to different usages and conditions, and accordingly, it is desired to comprehend such modifications within this invention as may fall within the scope of the appended claims.

What I claim is:

1. In a method for cutting by means of at least one wire through a block of light concrete or other plastic material, which block is manufactured by casting the material into a mould composed of a bottom and detachable, perpendicular, side walls, permitted to at least partially set and the cutting being effected according to a plane which is parallel or almost parallel to a side wall, the improvement consisting of removing two opposite side walls from the mould; subsequently disposing a flat auxiliary member against an uncovered side of the formed block, whilst applying simultaneously at least one vertical cutting wire between the block and this auxiliary member; rotating the block and auxiliary member 90° about a line coinciding with or being almost parallel to the intersecting line of the auxiliary member and the bottom, until the block entirely bears on the member; removing the original bottom from the mould and finally moving the wire(s) upward vertically through the block.

2. A method according to claim 1, wherein the auxiliary member is a horizontal conveyor member; a plurality of cutting wires are provided on the conveyor; the conveyor member and cutting wires are tilted against the side of the block and subsequently turned back together with the block.

References Cited

UNITED STATES PATENTS

| | | | |
|---|---|---|---|
| 2,941,253 | 6/1960 | Jakobsson | 264—157 |
| 44,806 | 10/1864 | Johnson | 83—648 |
| 3,660,553 | 5/1972 | Kalkman | 264—162 |

FOREIGN PATENTS

| | | | |
|---|---|---|---|
| 202,828 | 7/1956 | Australia | 264—147 |

ROBERT F. WHITE, Primary Examiner

T. E. BALHOFF, Assistant Examiner